Sept. 13, 1955  K. S. CARTER  2,717,745
AIRPLANE WHEEL BRAKE SYSTEM
Filed Sept. 7, 1951  3 Sheets-Sheet 1
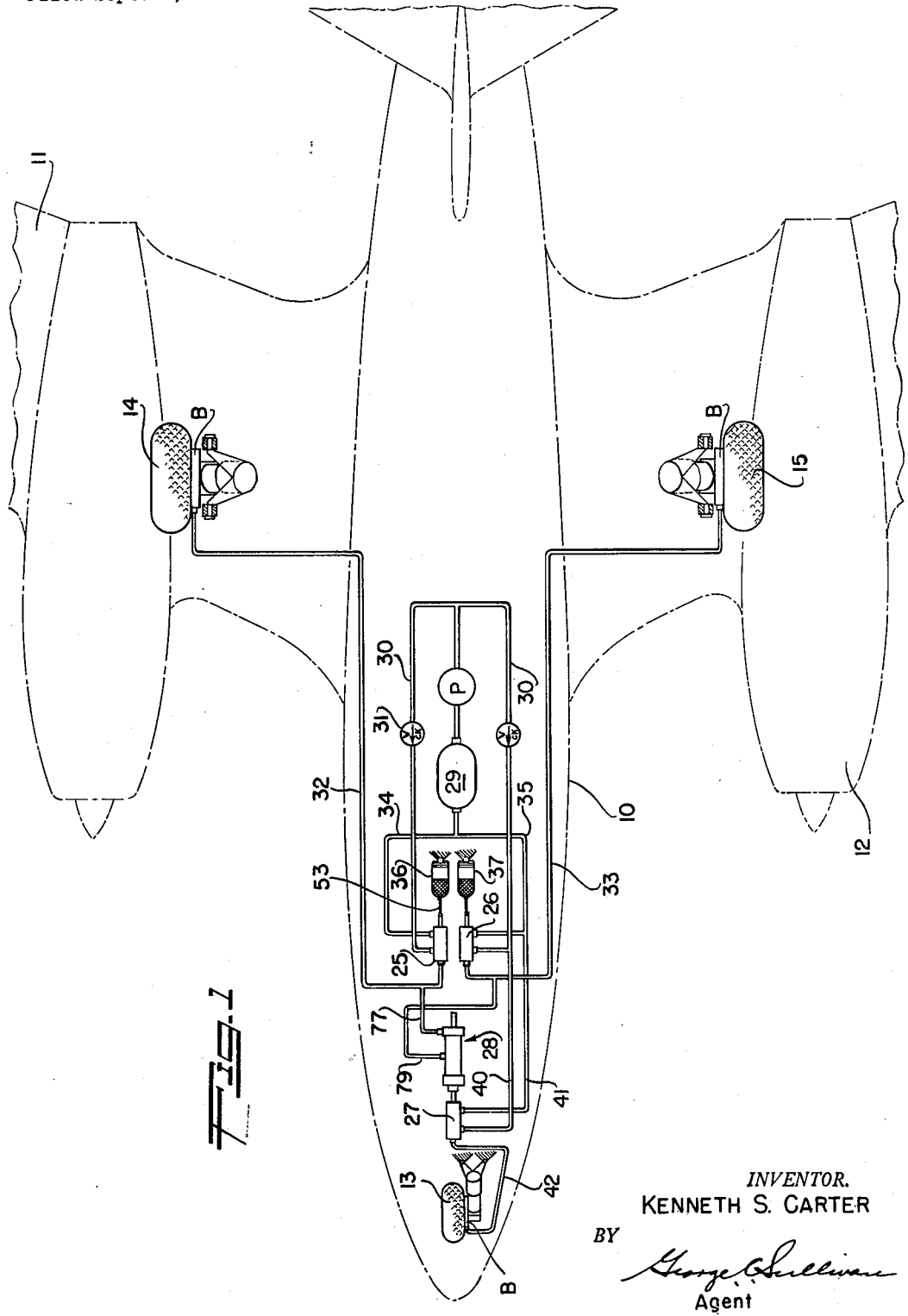
*INVENTOR.*
KENNETH S. CARTER
BY
*George C. Sullivan*
Agent Sept. 13, 1955  K. S. CARTER  2,717,745
AIRPLANE WHEEL BRAKE SYSTEM
Filed Sept. 7, 1951  3 Sheets-Sheet 2
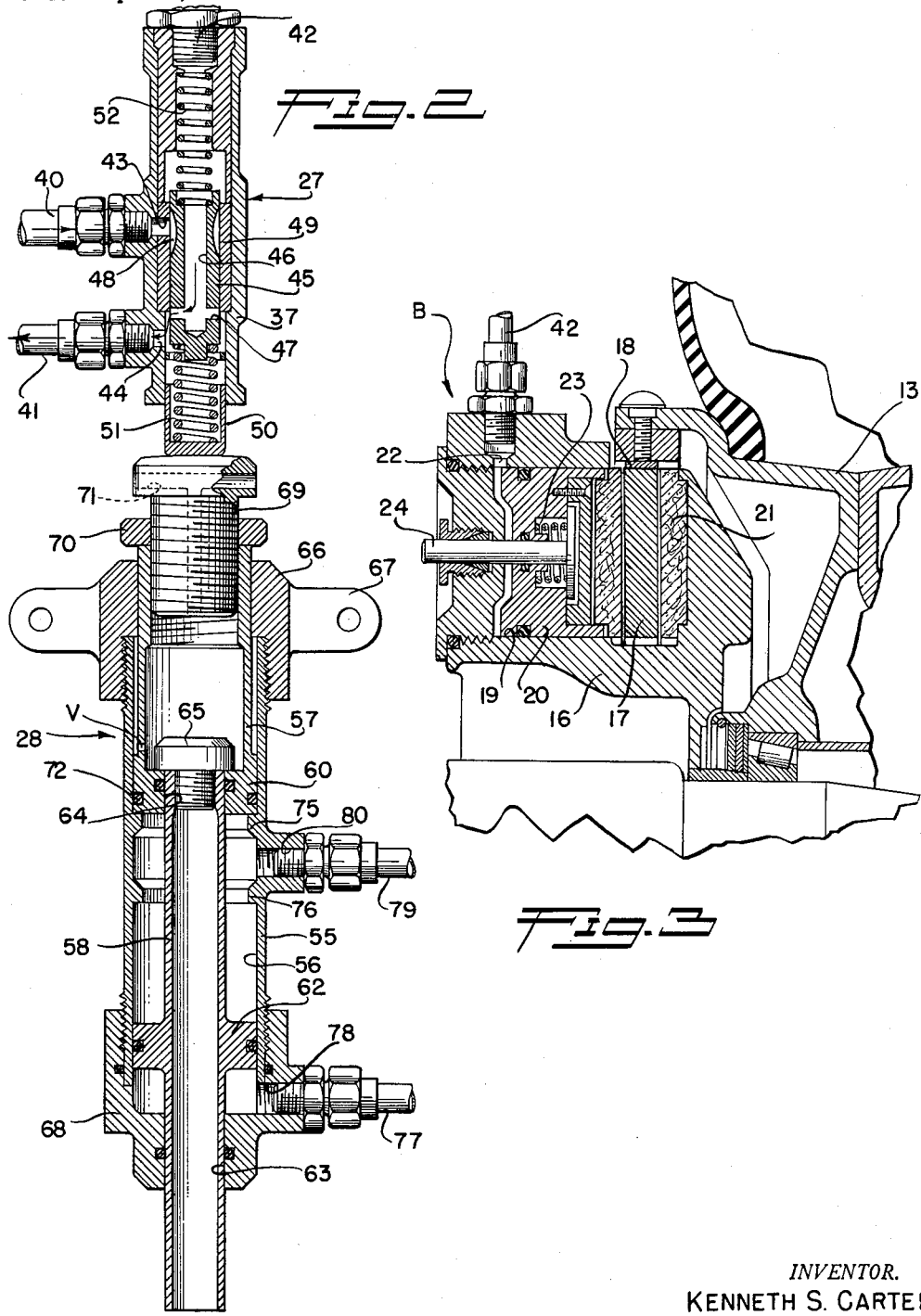
INVENTOR.
KENNETH S. CARTER
BY
Agent Sept. 13, 1955 K. S. CARTER 2,717,745
AIRPLANE WHEEL BRAKE SYSTEM
Filed Sept. 7, 1951 3 Sheets-Sheet 3
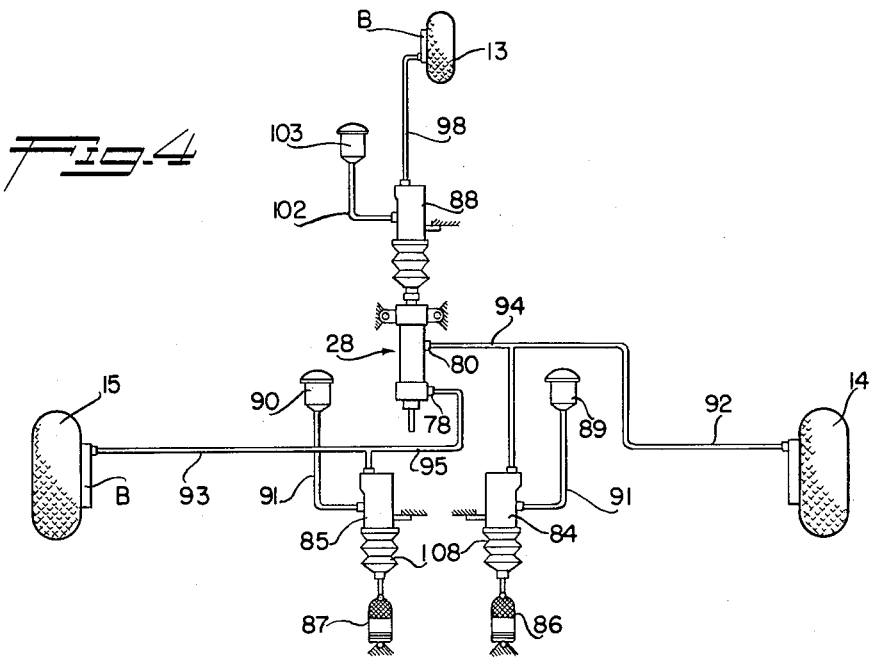
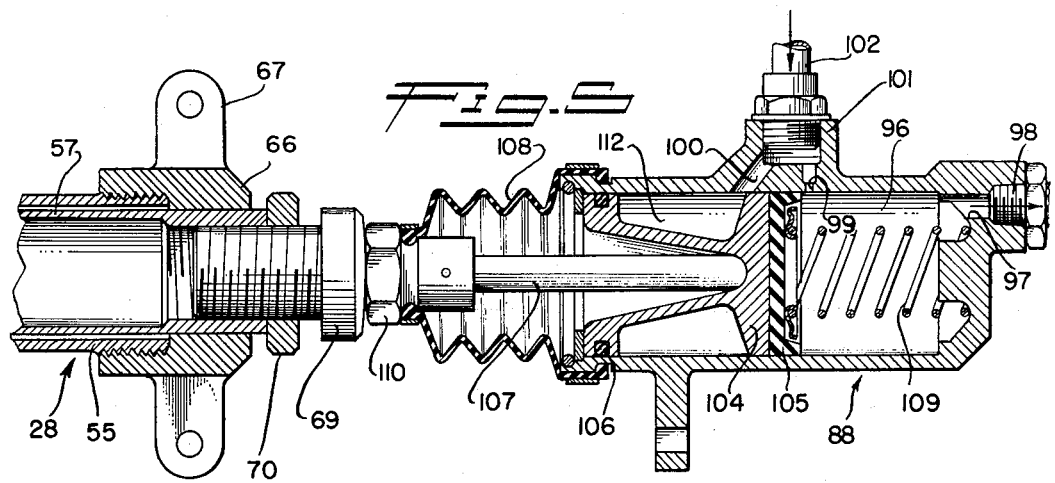
INVENTOR.
KENNETH S. CARTER
BY
*George Sullivan*
Agent United States Patent Office 2,717,745
Patented Sept. 13, 1955

2,717,745
AIRPLANE WHEEL BRAKE SYSTEM
Kenneth S. Carter, Glendale, Calif., assignor to Lockheed Aircraft Corporation, Burbank, Calif.
Application September 7, 1951, Serial No. 245,603
11 Claims. (Cl. 244—111)

This invention relates to fluid pressure systems and relates more particularly to such systems employed in the actuation of vehicle brakes and other fluid pressure actuated instrumentalities.

The present invention is concerned with a fluid pressure actuator and with systems employing the same, the actuator and systems being capable of use in various fields or applications. The invention is well adapted for control or actuation of the brakes of airplanes and I will herein refer to this application, it being understood that such reference to aircraft is not necessarily to be taken as a limitation upon the invention or its range of usefulness.

It is an object of the invention to provide a brake system for the landing wheels of an airplane, for example the wheels of a tricycle landing gear installation wherein the actuating fluid pressures are automatically and properly applied or metered to the brake of the nose wheel without the need for a separate pedal or other manual operating member for controlling this brake. In accordance with the invention the magnitude of the actuating fluid pressure applied to the nose wheel brake upon actuation of the brake system is automatically adjusted or metered to assure proper nose wheel brake operation under the various conditions that may occur during ground operations of the airplane.

Another object of the invention is to provide a brake actuating system of this kind that automatically operates to deliver or apply an actuating fluid pressure, either pneumatic or hydraulic, to the nose wheel brake proportional to the actuating pressures applied to the main wheel brakes when these latter pressures are equal and that is directly proportional to the lesser of the fluid pressures applied to the right or left wheel brake, supplying a reduced pressure to the nose wheel brake when one main wheel brake is actuated under less pressure than the other and supplying no pressure to the nose wheel brake when only one main wheel brake is being actuated. Furthermore, when the actuating fluid pressure to either or both of the main wheels is decreased the pressure to the nose wheel brake is simultaneously and proportionately decreased. These novel and entirely automatic actions of the system assure the most efficient operation of the nose wheel brake without skidding or unwanted freewheeling of the nose wheel under the various conditions of brake operation during landing of the airplane, taxiing and other ground maneuvers.

It is another object of the invention to provide a simple, practical and entirely automatic fluid pressure actuator that is operable to exert an output force proportional to the lesser of two independently variable input fluid pressures.

Another object of the invention is to provide an automatic actuator of this kind that will exert an output force proportional to two independent input fluid pressures and that operates upon a reduction in either or both of these input forces to automatically proportionately reduce the output force. Thus, if either one of the input pressures is reduced, the other remaining unreduced, the actuator automatically reduces the output force to be directly proportional to the lesser of the two input pressures and if both input pressures are simultaneously increased, or simultaneously reduced, the actuator serves to automatically and proportionately increase or decrease the output force.

A further object of the invention is to provide an actuator of this class wherein the input pressures may be either hydraulic or pneumatic or one may be hydraulic while the other is pneumatic.

Other objectives and features of the invention will become apparent from the following detailed description of typical illustrative forms and applications wherein reference will be made to the accompanying drawings in which:

Figure 1 is a schematic diagram of a typical brake system of the invention as applied to an airplane;

Figure 2 is an enlarged longitudinal sectional view of an actuator of the invention and the associated valve showing the actuator in the idle or balanced condition;

Figure 3 is an enlarged fragmentary sectional view of a portion of a brake of the kind that may be incorporated in the system illustrated in Figure 1;

Figure 4 is a schematic diagram of another brake system incorporating the invention; and Figure 5 is an enlarged longitudinal sectional view of the pressure generator for the nose wheel of the system of Figure 4 and showing a portion of the adjacent actuator.

While, as already pointed out, the actuator of the invention has numerous applications in various fields and classes of equipment, I have illustrated, as a typical use or application, the incorporation of the actuator in a brake operating system for the landing wheels of an airplane, it being understood that the invention is concerned with the actuator itself and such a system, or other system, incorporating the actuator as a component element. The particular airplane illustrated has a fuselage 10, wings 11, engine nacelles 12, and a tricycle type landing gear including a nose wheel 13 and right and left main wheels 14 and 15. The wheels 13, 14 and 15 may be equipped with any selected or appropriate type of fluid pressure operated brakes. Figure 3 illustrates, in some detail, a portion of one of the brakes for one of the landing wheels, for example, the wheel 13, it being understood that the brakes of the other wheels 14 and 15 may be similar or identical.

The brake, as shown in Figure 3, includes a brake frame or housing 16, stationarily secured to the airplane or landing gear structure, and a disc or drum 17 keyed to the wheel 13 at 18 to rotate therewith. One or more cylinders 19 are provided in the housing 16 and carry pistons 20. The pistons 20 are operable to compress or actuate an assembly of the disc 17 and friction material blocks or shoes 21 to brake rotation of the wheel. A port 22 admits actuating fluid pressure to the cylinder 19 and a spring 23 reacts between the piston 20 and the head of an adjusting pin 24 to retract the piston after each brake operation.

The brake system shown in Figure 1 includes, generally, a source of fluid pressure in the form of a pump P, or the equivalent, manually operable valves 25 and 26 for respectively controlling or metering the application of fluid pressure from the pump P to the brakes B of the wheels 14 and 15, a valve 27 for controlling the delivery or application of actuating fluid pressure to the brake B of the nose wheel 13 and an automatic actuator 28 for the valve 27 actuated or controlled by the fluid pressures supplied to the brakes of the main wheels 14 and 15.

The pump P is supplied with fluid, say, hydraulic fluid or brake liquid, by a suitable reservoir 29 and pressure supply lines 30 extend from the pump P to the valves 25 and 26. Appropriate check valves 31 may be interposed in the lines 30. Brake actuating pressure lines 32 and 33 extend from the valves 25 and 26 respectively, to their related wheels 14 and 15, serving to deliver the actuating fluid pressure to the ports 22 of the wheel brakes B. Thus the valves 25 and 26 constitute sources of actuating fluid pressure for their respective brakes B. The valves 25 and 26, in addition to controlling or metering the flow of actuating fluid pressure to the lines 32 and 33, control return lines 34 and 35 respectively, which serve to return the fluid medium to the reservoir 29. The valves 25 and 26 are adapted to be individually manually operated by the hands or feet of the pilot, copilot or other person. In the typical case illustrated the valves 25 and 26 are adapted to be operated by pivoted foot pedals 36 and 37. The valves 25 and 26 may be of any selected or appropriate type, for example they may be the same as the valve 27 which will be subsequently described in detail. With the system thus far described it will be seen that the flow of actuating pressure to the brakes B of the main landing wheels 14 and 15 is controlled or metered by manual actuation of the pedals 36 and 37 which may be operated to meter equal pressure to the two brakes B, unequal pressures to the brakes or pressure to one brake B while no pressure is supplied to the other brake.

The valve 27 for metering the actuating pressure to the nose wheel brake B has a pressure supply line 40 leading from one of the pressure lines 30 or directly from the pump P. A return line 41 extends from the valve 27 to one of the lines 34 or 35 or directly to the reservoir 29 and an actuating pressure line 42 extends from the valve 27 to the port 22 of the nose wheel brake B. The valve 27, which is shown in section in Figure 2, includes a cylinder or body 37 having spaced side or lateral ports 43 and 44 connected respectively with the pressure and return lines 40 and 41. The valve 27 further includes a spool or valve member 45 movable axially in the body 37 to control the ports 43 and 44. The member 45 has a central axial bore 46 open at its one end to be in communication with the brake line or actuating pressure line 42 leading to the port 22 of the nose wheel brake. Radial or lateral ports 47 are adapted to put the bore 46 in communication with the return port 44 when the member 45 is in the position illustrated in Figure 2. The valve member 45 also has an external annular groove 48 for co-operating with the pressure port 43. The valve cylinder or body 37 is provided with a fixed liner 49 which accurately receives the slidable member 45 and the parts are constructed and related so that the valve member is movable between the position illustrated, where the fluid pressure is free to return from the brake line 42 to the return line 41 through the ports 44 and 47, and the position where the return ports 47 are closed by the liner 49 and the pressure groove 48 is open at least to some extent to the interior of the valve body 37 and therefore the brake line 42 while at the same time registering with the pressure port 43. In practice, relatively small motions of the member 45 control the ports 47 and groove 48 and the groove 48 may be opened or "cracked" only slightly to meter relatively small amounts of fluid pressure to the nose wheel brake or may be opened relatively wide to admit full pressure to the brake.

The valve member 45 is operated by a plunger 50 slidable in an end of the valve body 37 and projecting therefrom. A spring 51 is arranged under compression between the plunger 50 and an end of the valve member 45 to transmit the actuating force to the member and a return spring 52 acts against the opposite end of the valve member to restore the same to a position such as illustrated in Figure 2, when the actuating force is removed from the plunger 50. In the case of the valves 25 and 26 for controlling the right and left wheel brakes B, their respective plungers 50 may be directly actuated by the above described foot pedals 36 and 37 or appropriate linkages 53 may be interposed between the pedals and the valve plungers 50.

The automatic actuator 28 as employed in the brake system illustrated in the drawings, serves to move or operate the plunger 50 of the brake valve 27 and thus acts to meter the actuating fluid pressure to the brake B of the nose wheel 13. The actuator 28 is preferably, though not necessarily, arranged adjacent the valve 27. In the case illustrated, an element or part of the actuator 28 directly contacts the plunger 50 of the valve 27 to actuate or move the same, it being understood that this is merely one simple manner of relating the valve and actuator.

The actuator 28 includes a shell or body 55 having an elongate fluid chamber 56. A cap 66 is threaded on one end of the body 55 and may have mounting lugs 67. A cap 68 may be provided on the opposite end of the body 55. Two plungers 57 and 58 operate in the chamber 56. The plunger 57 has a piston 60 on its inner end slidable in the chamber 56 and the plunger slidably passes through the cap 66 to project beyond one end of the actuator body assembly. The plunger 58 also has a piston 62 slidable in the body chamber 56 and the plunger 58 slidably passes through an opening 63 in the cap 68. It will be observed that the pistons 60 and 62 operating in the chamber 56 are of equal effective diameter. The plunger 57 is tubular or hollow and the inner portion of the plunger 58 enters the inner end of the plunger 57, being slidable in an opening 64 in the piston 60. A head 65 in the form of a bolt, or the like, is provided on the inner end of the plunger 58 and is cooperable with the piston 60 to limit relative longitudinal movement between the plungers in one direction. A head 69 in the nature of a bolt or the equivalent is adjustably threaded in the outer end of the plunger 57 and is equipped with a lock nut 70. The bolt 69 may serve as the force applying element of the actuator 28 and where the valve 27 and actuator 28 are axially aligned, as illustrated, the bolt 69 may directly engage the plunger 50 of the valve 27 to actuate the same. As will be readily apparent, the head or bolt 69 may be adjusted and then secured in the adjusted position by the nut 70 to obtain the proper operating relationship between the valve 27 and the actuator 28. The head or bolt 69 has a bleed or breather port 71 leading from the interior of the hollow plunger 57 to the atmosphere to allow the free displacement of air from the plunger. The pistons 60 and 62 have appropriate seal rings 72 for slidably cooperating with the wall of the chamber 56 and the openings 63 and 64 may be provided with packing or sealing rings for cooperating with the plunger 58. A vent port V is provided in the wall of the plunger 57 above the piston 60 to vent the space above the piston to the atmosphere.

Axially spaced stop shoulders 75 and 76 are provided on the wall of the chamber 56. The shoulder 75 is engageable by the piston 60 to limit inward travel of the plunger 57 and the shoulder 76 is engageable by the piston 62 to stop inward travel of the plunger 58. In accordance with the invention, one of the actuating fluid pressures is admitted to the chamber 56 between the pistons 60 and 62 while the other actuating pressure is admitted to the chamber below or at the outer side of the piston 62. A pipe 77 extends from the above described pressure line 32 to the right wheel brake B to a port 78 in the cap 68 and a pipe 79 leads from the pressure line 33 of the left wheel brake B to a port 80 between the two stop shoulders 75 and 76. With this arrangement the fluid pressure that is supplied or metered to the brake B of the left wheel 15 by the valve 26 is also simultaneously supplied to the chamber 56 to act on the inner or opposing sides of the pistons 60 and 62 while the pressure that is metered to the brake B of the right wheel 14 is simultaneously supplied to the chamber 56 to act on the under or outer side of the piston 62.

In describing the operation of the brake system illustrated in Figure 1 and the actuator 28, it will be assumed that the pump P is in operation and that a pilot or operator is manually operating the pedals 36 and 37 to control the brakes B during landing, taxiing, or other ground maneuvers of the airplane. First, let it be assumed that the pedals 36 and 37 are operated to meter equal pressure to the brakes B of the right and left wheels 14 and 15 so that equal pressures are supplied to the ports 78 and 80 of the actuator 28. The pressure admitted at the port 78 acts inwardly against the piston 62 with the same force as the pressure admitted by the port 80 and acting against the inner side of the same piston so that the plunger 58 is balanced between the equal pressures from the two ports 78 and 80. This leaves the equal pressure from the port 80 acting upon the inner side of the piston 60 free to move the assembly of the plungers 57 and 58 upwardly or toward the valve 27 so that the head 69 of the plunger 57 compresses the plunger 50 of the valve 27. The plunger 57 of the actuator 28 exerts a force or load on the valve plunger 50 proportional to the pressure at the ports 78 and 80 to meter actuating fluid pressure to the brake B of the nose wheel 13, the valve member 45 being actuated to meter fluid pressure to the nose wheel brake in proportion to the amount of pressure applied to the right and left wheel brakes. This would be the action during a straight ahead stop of the airplane. During such a stop, when the brake pressure is eased off a like amount on both the right and left wheel brakes B by reducing to an equal amount the pressure on the pedals 36 and 37, the effective pressure on the piston 60 is simultaneously and equally or proportionately reduced so that the braking action at the nose wheel brake B is proportionately reduced.

Now let it be assumed that the pedal 37 is actuated to bleed actuating pressure to the brake B of the left main wheel 15 but that the pedal 36 remains unactuated so that no pressure is supplied to the brake of the right main wheel 15. In this case the pressures acting outwardly against the opposing inner sides of the pistons 60 and 62 are equal and as there is no pressure acting on the under side of the piston 62 the plungers 57 and 58 both remain unactuated. Accordingly the nose wheel brake valve 27 remains unactuated and in the position of Figure 2 where no actuating pressure is supplied to the nose wheel brake. This would be representative of a turn to the left where the right main wheel 14 and the nose wheel 13 remain unbraked to facilitate the turn.

Let it be assumed that the pedal 36 is actuated to apply the brake B of the right main wheel 14 but that the pedal 37 remains unactuated so that no fluid pressure is metered to the brake B of the left main wheel 15. In this case actuating pressure is supplied to the port 78 to act on the outer or under side of the piston 62 but no pressure is applied to the inner sides of the pistons 60 and 62. The pressure acting on the outer or lower side of the piston 62 moves the plunger 58 upwardly to displace fluid from between the pistons 60 and 62 outwardly through the port 80 and line 79, thence into valve 26 which is in the "off" position, thence to reservoir 29 by way of line 35, the piston 62, moving upwardly until it stops against the shoulder 76, there being no movement transmitted to the plunger 57. As the plunger 57 remains unactuated the valve 27 of the nose wheel brake B also remains unactuated so that the brakes B of both the left main wheel 15 and the nose wheel 13 are unactuated. This is representative of brake operation during a right hand turn of the airplane where the brake of the right wheel 14 is applied but the brakes of the left main wheel 15 and nose wheel remain unactuated.

Where the pedals 36 and 37 are both operated but the pedal 36 is operated to a lesser extent than the pedal 37, the fluid pressure supplied to the port 78 is lower than the pressure supplied to the port 80. Since the pressure supplied by the port 80 acts with equal force on the inner sides of the two equal pistons 60 and 62, the plungers 57 and 58 are unactuated by this pressure. In this connection it will be observed that this pressure which tends to move the pistons 60 and 62 apart holds the head 65 in engagement with the upper side of the piston 60. Thus the highest or greatest fluid pressure provided by the port 80 is ineffective in moving the plungers 57 and 58 but the lower pressure acting on the under side of the plunger 62 and admitted from the port 78 moves the piston 62 upwardly, the two plungers 57 and 58 moving upwardly together as a unit by reason of the internal balanced pressure from the port 80. In this case the valve plunger 50 and member 45 are operated to an extent proportional to the pressure supplied by the port 78 which is the lesser of the two inlet pressures so that the brake B of the nose wheel 13 is operated by a force proportional to the force exerted in operating the brake B of the right main wheel 14.

Where the pedals 36 and 37 are both operated but the pedal 37 is operated to a lesser extent than the pedal 36, the fluid pressure metered to the port 80 is lower than the pressure metered to the port 78. Because the pressure acting on the lower or outer side of the piston 62 is greater than the pressure above the piston 62, there is a net upward or inward force on this piston. Thus the plunger 58 is moved upwardly or inwardly allowing the plunger 57 to follow under the action of the lower pressure and also move upwardly. In this case the actuating force moving the plunger 57, and therefore the valve member 45, is directly proportional to the lesser of the two inlet pressures, namely the pressure from the port 80 and the brake B of the nose wheel 13 is applied or actuated by this proportional force.

Figures 4 and 5 illustrate another form of brake system embodying the invention. It may be assumed that the main wheels 14 and 15 and nose wheel 13 and their respective brakes B are as described above, it being understood that any appropriate fluid pressure actuated brakes may be used. In this system the brakes B for the main wheels 14 and 15 are supplied with actuating fluid pressure by separate pressure generators 84 and 85 respectively. These generators 84 and 85, which may be manually operated by foot pedals 86 and 87, or the equivalent, are cylinder and piston devices of the type sometimes termed "master cylinders." For the purpose of the present disclosure it will be assumed that the actuators or pressure generators 84 and 85 are of the same construction as the fluid pressure generator 88 for the brake B of the nose wheel 13, which generator 88 is illustrated in detail in Figure 5 and will be described below. The pressure generators 84 and 85 have appropriate reservoirs 89 and 90 respectively and pipes or lines 91 carry the fluid from the reservoirs to their respective actuators. A pipe or pressure line 92 extends from the pressure generator 84 to the port 22 of the brake B for the right main wheel 14 and a similar pressure line 93 conducts pressure from the generator 85 to the port 22 of the brake B for the left main wheel 15.

The system of Figure 4 further includes an actuator 28 which may be the same as the actuator 28 described above and embodied in the system of Figure 1. This automatic actuator 28 receives and is actuated by the fluid pressures from the pressure generators 84 and 85 and serves to actuate the pressure generator 88. Thus a line 94 extends from the output or pressure line 92 of the generator 84 to the port 80 of the actuator 28 and a similar pipe 95 extends from the pressure line 93 of the actuator 85 to the port 78.

Figure 5 illustrates the pressure generator 88 for the brake B of the nose wheel 13 and the operative connection or association of the automatic actuator 28 with the pressure generator 88. The generator 88 includes a cylinder 96 having a pressure port 97 in one end. A pressure line 98 extends from the port 97 to the pressure port 22 of the brake B for the nose wheel 13. The cylinder 96 also has a lateral inlet port 100 and a lateral compensating port 99 both joining an inlet fitting 101. A line 102 connects the fitting 101 with a reservoir 103. A piston 104 operates in the cylinder 96 and is equipped with suitable spaced seals 105 and 106. A piston rod 107 engages in the rear side of the piston 104 and extends from the end of the cylinder 96. The projecting portion of the rod 107 and the end of the cylinder 96 may be protected by a rubber boot 108. A spring 109 is engaged between the piston seal 105 and the opposite end of the cylinder 96 to return the piston 104. The piston rod 107 may be operatively associated with the head 69 of the automatic actuator 28 in any selected or appropriate manner. I have shown the actuator 28 and generator 88 in adjacent axial alignment, with a nut or coupling 110 on the piston rod 107 engaged on or connected with the head 69 of the actuator 28. The piston 104 of the pressure generator 88 is formed with an annular external cavity 112 which is in communication with the inlet port 100 with the piston in any of its possible positions and which has communication with both the port 100 and the compensating port 99 when the piston is in the position where the associated brake B is fully or substantially fully applied.

In the case of the pressure generators 84 and 85, for operating the brakes B of the wheels 14 and 15, the inlet fittings 101 of the generators communicate or connect with the reservoir lines 91 and the piston rods 107 may be directly operatively connected with the respective pedals 86 or 87 or connected with the pedals through appropriate linkages.

The operation of the brake system illustrated in Figures 4 and 5 is substantially the same as the operation of the system shown in Figures 1, 2 and 3. When the pedals 86 and 87 are operated with equal force, the pressure generators 84 and 85 develop equal pressures and the main wheel brakes B are applied with equal force, equal fluid pressures being supplied to the lines 94 and 95. As the ports 80 and 78 are respectively in communication with these lines 94 and 95, equal fluid pressures are supplied to the ports. As previously described, when equal pressures are supplied to the ports 78 and 80, the plunger 57 of the automatic actuator 28 is operated with a force proportional to the pressure at the ports. Accordingly, the piston 104 of the generator 88 is operated with a force proportional to the pressure applied to the brakes B of the main wheels 14 and 15 and the brake B of the nose wheel 13 is actuated with a proportional force. In the case where one pedal 86 or 87 is actuated and the other pedal is not, pressure is generated by one generator 84 or 85 to actuate but one brake B of a main wheel 14 or 15. In such a case, pressure is supplied to only one port 78 or 80 of the automatic actuator 28 and the plunger 57 is not actuated to move the piston 104, this inaction of the plunger under such circumstances having been previously described. Accordingly the brake B of the nose wheel 13 is not applied or actuated when the brake B of only one main wheel 14 or 15 is applied. However, when both pedals 86 and 87 are operated to apply the brakes B at both main wheels 14 and 15 but one pedal is operated with more force than the other, unequal pressures are applied to the ports 78 and 80 of the automatic actuator 28. As previously described in such a case the plunger 57 of the actuator is moved outwardly with a force directly proportional to the lesser of the two fluid pressures. The plunger 57 in such a case moves the piston 104 of the generator 88 with a force proportional to the lesser pressure, so that the brake B of the nose wheel 13 is applied with a force directly proportional to the force applied at the main wheel brake B, that is itself actuated with the lesser force.

Where the nose wheel of a conventional tricycle type aircraft landing gear is provided with a brake, there is considerable danger of skidding the nose wheel tire by inadvertently applying excessive brake pressure. However, it will be seen that with the device and systems of the present invention the brake B of the nose wheel 13 is actuated under high pressure only when the pressures applied to the brakes B of the main wheels 14 and 15 are also high, and vice versa. As the main wheel brake pressure is increased the resultant deceleration of the airplane causes an increase in vertical load on the nose wheel 13, thereby making it possible to utilize increased actuating pressure at the nose wheel brake B without causing the tire to skid. Conversely, when the actuating pressure to either or both of the main wheel brakes is eased off or reduced, the pressure supplied to the nose wheel brake B is simultaneously and proportionately lessened, thus preventing the development of an undesirable skid at the nose wheel tire. The actuator 28 is entirely automatic in operation and the brake system of the invention is such that there is no necessity for providing a separate or special pedal or other manual operating member for controlling the brake of the nose wheel 13.

Having described only typical forms of the invention I do not wish to be limited to the specific details herein set forth, but wish to reserve to myself any variations or modifications that may appear to those skilled in the art and fall within the scope of the following claims.

I claim:

1. In an airplane having a nose wheel, a right main wheel and a left main wheel the combination of; fluid pressure operated brakes for braking rotation of the respective wheels, and fluid pressure means for actuating the brakes comprising a fluid pressure source, a conduit system for conducting the fluid pressure from the source to the brakes, a manually operated control valve in the system for the brake of each main wheel operable to meter actuating fluid pressure to its respective brake, a valve in the conduit system for metering actuating fluid pressure to the nose wheel brake, and an automatic actuator in actuating relation with the last named valve actuated by the fluid pressures metered to the main wheel brakes to actuate said last named valve so as to produce a braking force at the nose wheel proportional to the lesser of the actuating pressures metered to two main wheel brakes and proportional to said pressures when they are equal.

2. In an airplane having a nose wheel, a right main wheel and a left main wheel the combination of; fluid pressure operated brakes for braking rotation of the wheels, and a fluid pressure system for actuating the brakes comprising a fluid pressure source, a conduit arrangement for conducting the fluid pressure from said source to the brakes, a control valve in the conduit arrangement for each brake operable to meter actuating fluid pressure from said source to the respective brake, independently operable manual operating means for the control valves of the main wheel brakes, and an automatic actuator operatively associated with the control valve of the nose wheel brake and operated by the fluid pressures metered to the main wheel brakes to actuate the control valve of the nose wheel brake with a force proportional to the lesser of said metered fluid pressures.

3. In an airplane having a nose wheel, a right main wheel and a left main wheel the combination of; fluid pressure operated brakes for braking rotation of the wheels, and fluid pressure system for actuating the brakes comprising a source of actuating fluid pressure, a system of conduits for conducting the actuating fluid pressure from said source to the brakes, a control valve in the conduit system for the brake of each main wheel operable to meter fluid pressure from said source to its respective brake to operate the same, a separately operable means for operating each of said valves, a valve in the conduit system for metering fluid pressure from said source to the brake of the nose wheel to actuate the same and a cylinder and piston device operable by the fluid pressures metered to the main wheels in operative connection with the last named valve and operating the same with a force proportional to the lesser of said metered pressures.

4. In an airplane having a nose wheel, a right main wheel and a left main wheel the combination of; fluid pressure operated brakes for braking rotation of the wheels, and a fluid pressure system for actuating the brakes comprising a source of actuating fluid pressure, a control valve for the brake of each main wheel operable to meter fluid pressure from said source to its respective brake to operate the same, a separately operable means for operating each of said valves, a valve for metering fluid pressure from said source to the brake of the nose wheel to actuate the same, including a member movable to vary the pressure metered to the nose wheel brake, a cylinder and ram device to be actuated by the fluid pressures metered to main wheel brakes and operable thereby to actuate the last named valve, said device including a fluid pressure operated ram for moving said member of the valve, and means for conducting the fluid pressures which are metered to the main wheels to said cylinder and ram device to actuate the same.

5. In a system for braking rotation of a rotating member the combination of; a brake having a movable part to be actuated to brake rotation of the member, two independently variable sources of fluid pressure, and a device actuated by the fluid pressures from said sources for moving said part with a force proportional to the lesser of said pressures and to said pressures when they are equal, the device including a cylinder having two axially spaced ports each in communication with one of said sources, and two telescopically related rams operable in the cylinder, one ram being operatively associated with said part to actuate the same and having a piston acted upon by the pressure from one port, the other ram having a piston with one side acted upon by the pressure from one port and one side acted upon by the pressure from the other port, and cooperable parts on the rams engageable to limit relative axial movement between the rams in one direction.

6. In a system for braking rotation of a wheel the combination of; a brake having a movable part to be actuated to brake rotation of the wheel, two independently variable sources of fluid pressure, and a device actuated by the fluid pressures from said sources for actuating said movable part with a force proportional to the lesser of said pressures and proportional to said pressures when equal, the device including a cylinder having two axially spaced ports each in communication with one of said sources, and two telescopically related rams operable in the cylinder, one ram being operatively associated with said part to move the same and having a piston acted upon by the pressure from one port, the other ram having a piston with one side acted upon by the pressure from one port and one side acted upon by the pressure from the other port, a stop in the cylinder for limiting movement of the pistons toward one another, and a stop on said other ram engageable with the first named piston for limiting movement of the pistons away from one another.

7. In a system for braking rotation of a wheel the combination of; a movable brake part to be actuated to brake rotation of the wheel, two independently variable sources of fluid pressure, and a device actuated by the fluid pressures from said sources for moving said part with a force proportional to the lesser of said pressures and proportional to said pressures when equal, the device including a cylinder having a first port in communication with one of said sources and a second port spaced axially from the first port and communicating with the other source, a first ram operatively associated with said part operable in the cylinder to move said part and including a first piston having one side exposed to the pressure from said first port, a second piston including a second piston operable in said cylinder having one side facing said side of the first piston and exposed to the pressure from said first port and having its other side exposed to the pressure from said second port, stop means for limiting movement of the pistons toward one another, and stop means on the rams for limiting relative movement of the rams in the other direction.

8. In an airplane having a nose wheel and two main landing wheels the combination of; fluid pressure actuated brakes for braking rotation of the main wheels, a pressure actuated brake for braking rotation of the nose wheel, separate manually variable sources of fluid pressure for applying actuating fluid pressure to the brakes of the main wheels, means operable to supply actuating pressure for the brake of the nose wheel, pressure lines in communication with said sources of actuating fluid pressure, and an automatic actuator in operating connection with said means and operated by the pressures in said lines to operate said means with a force proportional to the lesser of said pressures and proportional to said pressures when they are equal.

9. In combination with an airplane having a nose wheel and two main wheels and a fluid pressure operated brake for braking rotation of each wheel the combination of; a fluid pressure generating device for each brake operable to produce pressure for the operation of its respective brake, means for conducting the fluid pressures thus generated to the respective brakes, a manual means for operating the pressure generating device of each main wheel brake, and an automatic actuator operated by the pressures from the pressure generating devices of the main wheel brakes in operating connection with the pressure generating device of the nose wheel brake operable to actuate the same with a force proportional to the lesser of the pressures generated by said devices of the main wheel brakes and proportional to said pressures when they are equal.

10. In combination with an airplane having a nose wheel and two main wheels and a fluid pressure operated brake for braking rotation of each wheel the combination of; a fluid pressure generating device for each brake operable to produce pressure for the operation of its respective brake, means for conducting the fluid pressures thus developed to the respective brakes, a manual means for operating the pressure generating device of each main wheel brake, and an automatic actuator operated by the pressures from the pressure generating devices of the main wheel brakes in operating connection with the pressure generating device of the nose wheel brake to actuate the same with a force proportional to the lesser of the pressures generated by said devices of the main wheel brakes, said actuator including a cylinder having two spaced ports, means maintaining one port in communication with said pressure generating device of one main wheel brake, means maintaining the other port in communication with said pressure generating device of the other main wheel brake, and telescopically related plungers having pistons acted upon by the fluid pressures from said ports and operable in the cylinder to actuate said device of the nose wheel.

11. In a system of the character described the combination of two devices designed for fluid pressure actuation, a third device designed for fluid pressure actuation and including a control unit having a part movable to determine the extent of actuation of the third device, a source of variable actuating fluid pressure for each of said two devices, means for conducting said actuating fluid pressures to said two devices, a fluid pressure operable cylinder and ram mechanism for moving said part, and means for conducting said actuating fluid pressures to the cylinder and ram device to actuate the same, said cylinder and ram device moving said part a distance proportional to the lesser of said actuating fluid pressures.

References Cited in the file of this patent

UNITED STATES PATENTS

| | | |
|---|---|---|
| 1,895,452 | Dormoy | Jan. 31, 1933 |
| 2,336,891 | Schnell | Dec. 14, 1943 |
| 2,473,687 | Kershaw | June 21, 1949 |
| 2,474,630 | Jamison | June 28, 1949 |
| 2,512,013 | Down | June 20, 1950 |
| 2,565,689 | Howse | Aug. 28, 1951 |
| 2,573,563 | Gardiner | Oct. 30, 1951 |

FOREIGN PATENTS

| | | |
|---|---|---|
| 84,554 | Switzerland | Mar. 16, 1920 |